United States Patent [19]
Thompson

[11] Patent Number: 5,160,174
[45] Date of Patent: Nov. 3, 1992

[54] TELESCOPING PIPES AND APPLICATION FOR SUCH TELESCOPING PIPES IN FIRE SPRINKLER SYSTEMS

[76] Inventor: William Thompson, 36 Trinidad Way, Happy Valley, South Australia 5159, Australia

[21] Appl. No.: 619,841

[22] Filed: Nov. 29, 1990

[30] Foreign Application Priority Data

Nov. 29, 1989 [AU] Australia .................. PJ7620

[51] Int. Cl.⁵ .................................................. F16L 27/12
[52] U.S. Cl. ........................................ 285/32; 285/39; 285/89; 285/298; 285/302; 285/387
[58] Field of Search ............. 285/298, 32, 39, 89, 285/302, 387, 357

[56] References Cited

U.S. PATENT DOCUMENTS

| | | | |
|---|---|---|---|
| 299,661 | 6/1884 | Martin | 285/302 X |
| 301,900 | 7/1884 | Kimble | 285/302 |
| 958,752 | 5/1910 | Mackensen | 285/302 |
| 969,358 | 9/1910 | Goodall | 285/32 |
| 982,836 | 1/1911 | Ley et al. | 285/302 |
| 1,041,260 | 10/1912 | Erickson | 285/39 X |
| 1,308,853 | 7/1919 | McVoy | 285/32 |
| 2,078,192 | 4/1937 | Buhr et al. | 279/9 |
| 2,521,127 | 9/1950 | Price | 285/302 X |
| 2,968,440 | 1/1961 | Cone | 239/203 |
| 3,180,659 | 4/1965 | Vigneron | 285/89 X |
| 3,451,483 | 6/1969 | Van Houte | 169/37 |
| 3,529,671 | 9/1970 | Adams, Jr. | 169/41 |
| 3,807,503 | 4/1974 | Iasillo, Sr. | 169/37 |
| 4,007,877 | 2/1977 | Jackson et al. | 239/209 |
| 4,083,410 | 4/1978 | Anderson | 169/37 |
| 4,433,725 | 2/1984 | Bowyer | 166/65 |
| 4,603,887 | 8/1986 | Mayfield et al. | 285/32 |

Primary Examiner—Randolph A. Reese
Assistant Examiner—Heather Chun
Attorney, Agent, or Firm—Cushman, Darby & Cushman

[57] ABSTRACT

A telescopic pipe arrangement for use in situations where neither end can be rotated to change the length. An inner nut on an inner pipe bears against an end of an outer pipe and an outer nut either locks against the inner nut to enable inward or outward movement or locks against the outer pipe to lock the arrangement.

8 Claims, 3 Drawing Sheets

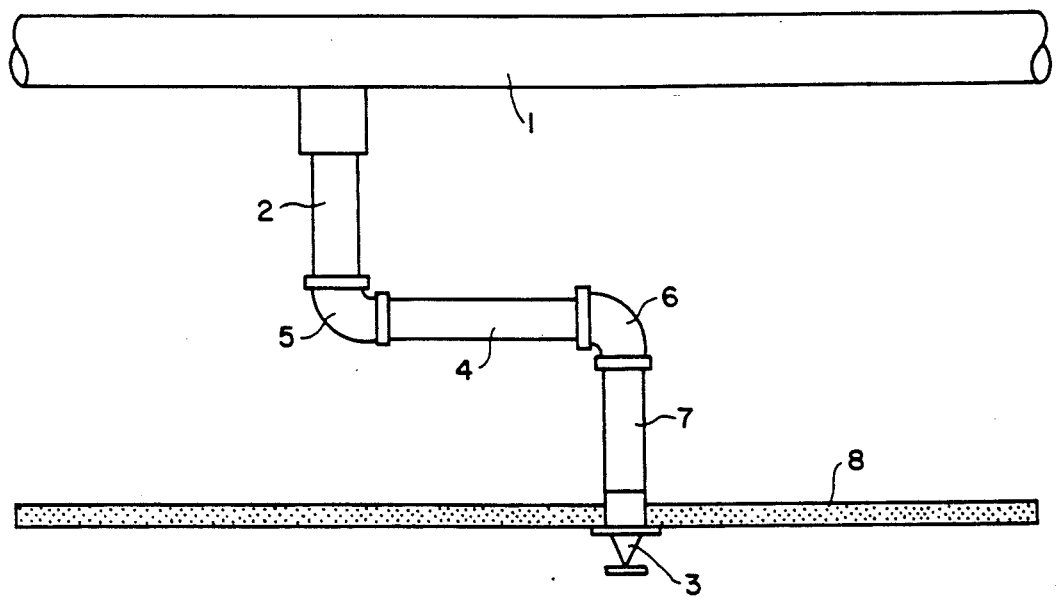
FIG. 1
FIG. 2
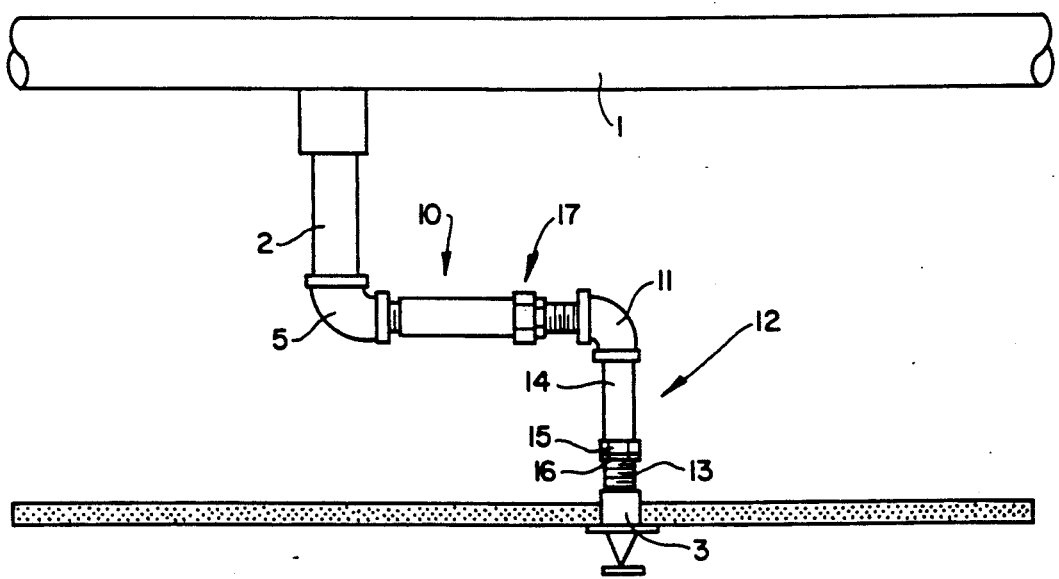

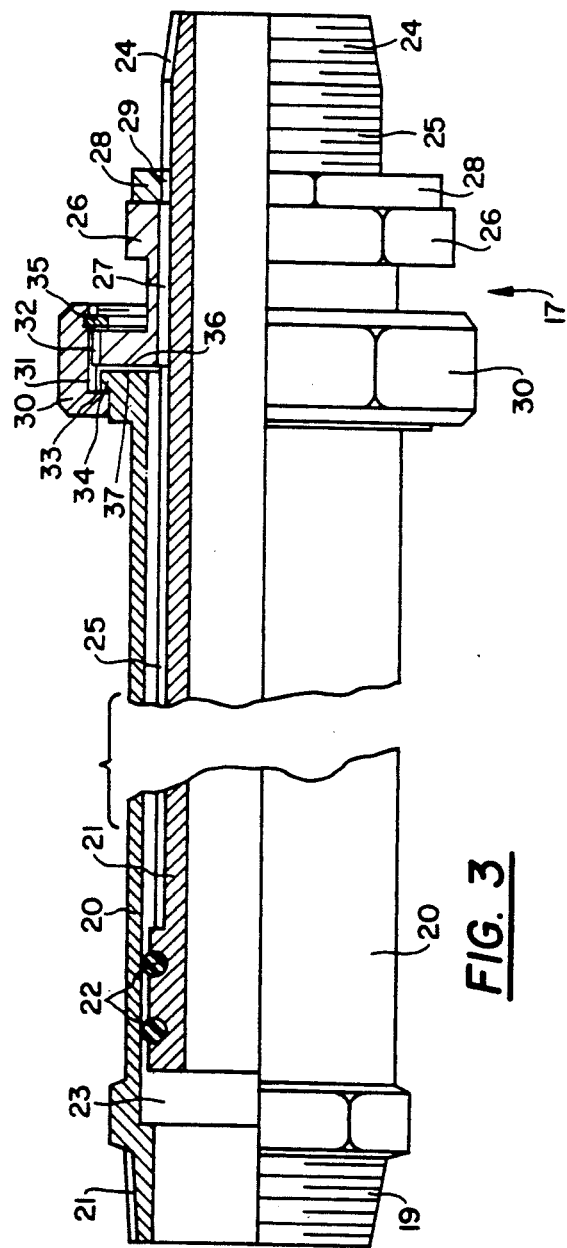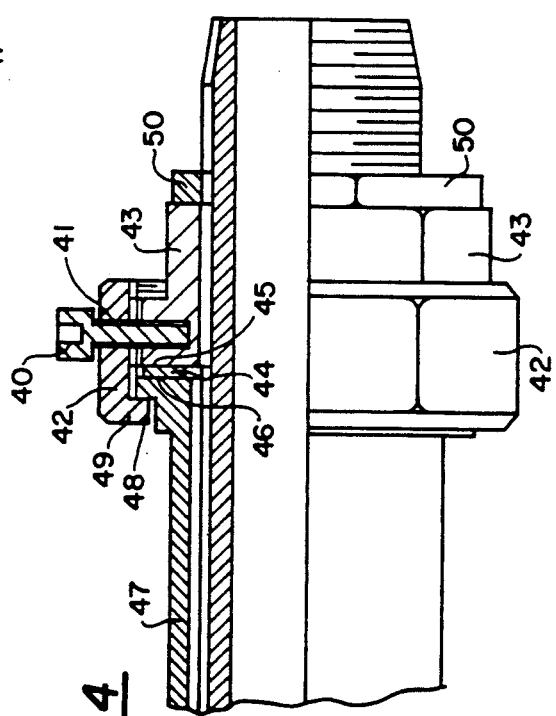

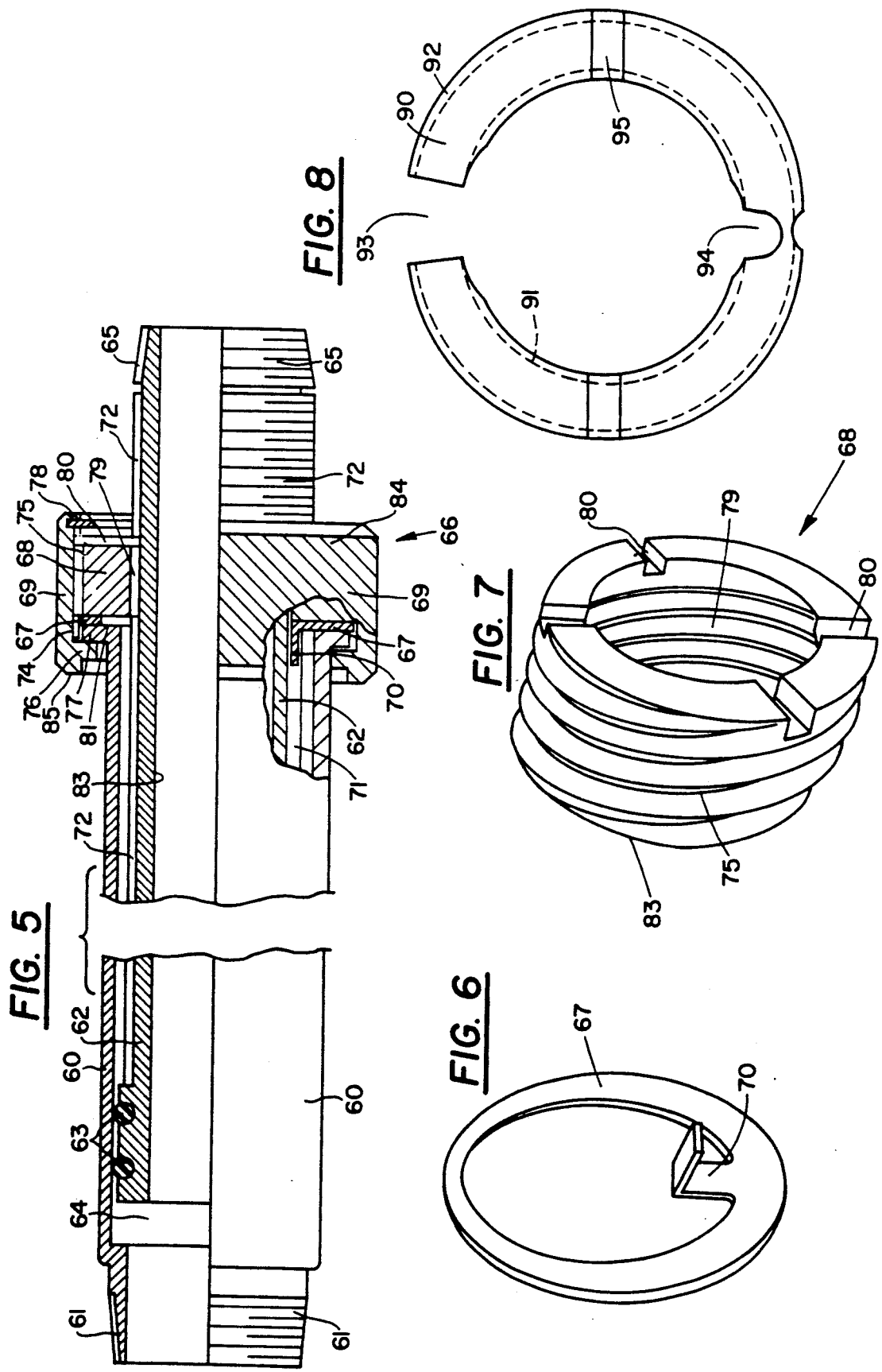

TELESCOPING PIPES AND APPLICATION FOR SUCH TELESCOPING PIPES IN FIRE SPRINKLER SYSTEMS

BACKGROUND OF THE INVENTION

This invention relates to pipe arrangements which may be telescoped and applications for such telescoping pipes.

The particular problem to which this invention is directed is to provide a pipe which can be telescoped within another pipe and can be locked at any desired length such that the internal or second pipe cannot be rotated with respect to the external first pipe but a good fluid seal can be provided. One particular application of such a pipe assembly is in the installation of fire sprinklers in commercial or industrial buildings. In such buildings fitted with suspended ceilings there is a necessity to accurately install sprinkler heads in the centers of ceiling tiles for aesthetic purposes.

SUMMARY OF THE INVENTION

It is an object of this invention to provide a method to reduce the time it takes to accurately measure, cut and install at a second fix stage pipe work to enable the sprinkler heads to be fitted to the correct position in the ceiling tiles.

When installing a fire sprinkler system in a multistory building the procedure of installation of pipe work is done in at least two operations known generally as first and second fix. (In the U.S. these are more commonly known as "rough" and "finish" stages of plumbing or mechanical work.) These operations follow one another but may be many months apart in a building programme. In the first fix the main water pipes and distribution pipe work is installed but because at that stage the exact positioning of ceiling tiles is not known it is not possible to install sprinkler heads. In general therefore it is the practice to install a dropper pipe extending from a mains distribution pipe and then plug this pipe off and pressure test the main system and then after the ceiling tile has been installed to remove the plug and add the necessary horizontal and vertical pipes to extend the pipe work to the sprinkler head position and then to install the sprinkler head. For each dropper pipe, therefore, and there may be up to a hundred or more on a floor of a building, the exact lengths of the horizontal and vertical pipes must be measured and cut individually.

It is another object of this invention to provide a telescopic pipe arrangement particularly for the horizontal pipes of such a fire sprinkler system, which will enable the entire system to be installed at first fix and then just require adjustment at second fix to get the sprinkler heads in the correct positions. For this to occur, therefore, it is necessary to provide telescopic arrangements for both the vertical and horizontal sections of pipe, and particularly for the horizontal pipes there is a problem that once the vertical pipes are fitted to the respective horizontal pipes the ends of the horizontal pipes cannot be rotated so a telescopic arrangement which requires no rotation of the pipe at one end of the arrangement relative to the pipe at the other is desirable.

It is to be realized of course that the telescopic arrangement, of the present invention is applicable to many other types of installation than fire sprinkler systems, but to assist with understanding the invention reference will be made to this particular application in the general discussion.

The invention provides a telescopic pipe arrangement comprising a first pipe and a second pipe concentrically arranged within the first pipe and sealably engaged to the inner wall of the first pipe and able to move longitudinally therein, longitudinal movement of the second pipe in the first pipe being achieved by the second pipe having a screw-threaded outer surface along at least part of its length and a first nut engaged onto this screw-threaded portion of the second pipe and bearing onto an end of the first pipe, a second nut engaged by means of a screw thread onto the first nut and engageable also on an abutment on the end of the first pipe, the second nut having a first engagement position with respect to the first nut where it is locked onto the first nut such that they may be both rotated together with respect to both the first and second pipes to cause relative telescoping of the first and second pipes, and the second nut having a second engagement position where it engages the abutment on the first pipe and causes the first nut to engage the end of the first pipe to prevent relative rotation of the first pipe and the first nut, and locking means to prevent rotation of the second pipe with respect to the first pipe.

It will be seen that by this invention there is provided an arrangement whereby neither the first nor second pipe need be rotated, but the first nut and the second nut arrangement between the first and second pipe can be rotated to lengthen or shorten the amount of telescoping of the second pipe within the first pipe.

This invention allows at least the horizontal pipe in a sprinkler system to be adjusted in length, in instances where the vertical pipe portion cannot be rotated with respect to the horizontal pipe.

Various arrangements may be provided for telescoping the vertical pipe and an arrangement similar to the device discussed above or a simpler arrangement may be provided.

The locking means may be a lock nut threaded onto the second pipe and engageable onto the end face of the first nut.

Alternatively, the locking means may be a lock washer engageable between the first nut and the end of the first pipe. Such a lock washer may include a locking tab on its internal diameter, which can be engaged into a longitudinal keyway in the second pipe. The locking tab may include a portion extending at right angles to the plane of the washer to more securely engage within the keyway.

The first nut according to this invention may have an internal thread engageable onto this second pipe and an external thread engaged within an internal thread in the second nut. The first nut may have flats on one end thereof engageable by a spanner (i.e., a common tool more commonly known in the U.S. as a wrench), or may have grooves in an end face engageable with a peg spanner (the colloquial name which may be used for such a wrench in the U.S. not being known to the present inventor, who is Australian) to enable rotation of the first nut.

The second nut may have an internal thread into which the external thread of the first nut is engaged, and a circlip at an end remote from the end engaged onto the first pipe against which the first nut can engage to provide the first engagement position.

In one embodiment there may also be provided a packing washer between the first nut and the end face of the first pipe so that when the second nut is moved onto the first pipe there may be good lock between the components. There may be provided O-ring seals where the second pipe engages the inner wall of the first pipe so that a good seal is provided.

In an alternate embodiment, there may be used a locking screw to engage the second nut with the first nut. Such a locking screw may extend radially and extend through a slotted aperture in the second nut so that when the locking screw is locked at one end of the aperture, both the second nut and the first nut may be rotated with respect to the first and second pipes, and when the locking screw is towards the other end of the aperture enable the second nut to engage the end of the first pipe to prevent relative rotation of the first pipe and the first nut.

BRIEF DESCRIPTION OF THE DRAWINGS

To assist with the invention reference will now be made to the accompanying drawings which show preferred embodiments of the invention.

In the drawings,

FIG. 1 shows a prior art installation of a building fire sprinkler arrangement,

FIG. 2 shows the installation of a building fire sprinkler arrangement with an embodiment of the present invention, FIG. 3 shows a part section view of one embodiment of a telescoping arrangement according to this invention, FIG. 4 shows an alternate embodiment of a telescoping pipe arrangement according to this invention, FIG. 5 shows a part section view of an alternative embodiment of a telescoping arrangement according to this invention, FIG. 6 shows a locking washer suitable for use in the embodiment shown in FIG. 5, FIG. 7 shows a first nut suitable for use in the embodiment shown in FIG. 5, and FIG. 8 shows an alternative embodiment of first nut suitable for the embodiment shown in FIG. 5.

DETAILED DESCRIPTION

Now looking more closely at the drawings and in particular FIG. 1, it will be seen that a prior art fire sprinkler water distribution system comprises a mains distribution pipe 1 having a plurality of dropper pipes 2 at approximate positions where sprinkler heads 3 are required. To enable installation of the sprinkler heads it is necessary to install a horizontal pipe section 4 with a first elbow 5 and a second elbow 6 with a vertical pipe section 7 extending down to the sprinkler head 3. The sprinkler head then extends through a ceiling tile 8.

The requisite lengths for the horizontal pipe 4 and the vertical pipe 7 cannot be measured until the ceiling tile has been installed and at that stage it is difficult to work in the ceiling and hence installation is difficult. The arrangement as shown in FIG. 2 will overcome a lot of these problems. As in the prior art arrangement, a mains distribution pipe 1 has a dropper 2 extending down to an elbow 5 and then a telescoping pipe portion generally shown as 10 extends to a second elbow 11 and then a further telescoping vertical pipe section 12 extends to the sprinkler head 3.

Whereas the horizontal and vertical pipes 4 and 7 of the prior art installation can only be installed, after the ceiling tiles have been installed the arrangement of the present invention as shown in FIG. 2 can have its vertical pipe 12 and its horizontal pipe 10 installed at the time of first fix and then these two pipes telescoped as necessary to put the sprinkler head in the correct position after installation of the ceiling tiles.

The actual operation of several embodiments of the horizontal telescoping pipe 10 will be discussed in relation to the FIGS. 3 to 8, but first a brief description of the vertical telescoping pipe be given.

The vertical telescoping pipe 12 has a threaded internal pipe 13 in an outer pipe 14 with a nut 15 fixed to the outer pipe with an internal thread such that rotation of the pipe 13 in the nut 15 either shortens or lengthens the extent of the pipe 13 from the pipe 14. A lock nut 16 may be used to lock the resulting pipe arrangement at a desired length.

This simple telescoping arrangement is possible because the sprinkler head 3 can be rotated with respect to the pipe 14.

It is not possible, however, to rotate the elbow 11 with respect to the pipe 10, because the vertical pipe may interfere with other services and the like in the ceiling space and hence the telescoping arrangement of the present invention is provided, as will be further discussed in relation to FIGS. 3 to 8.

Now looking at FIG. 3 it will be seen that there is provided a horizontal pipe arrangement 10 (FIG. 2) having an outer pipe 20 with threads 19 at one end to engage the elbow 5 (FIG. 2). An internal pipe has O-ring seals 22 engaged onto the inner wall 23 of the pipe 20 and the second pipe extends to a tapering screw-threaded portion 24 which engages with elbow 11 (FIG. 2). A telescoping arrangement generally shown as 17 provides engagement and adjustment between the first pipe and the second pipe. The first pipe 21 has a long screw thread 25 on its outer surface, and a first nut 26 has a screw thread 27 on its inner surface with engages the screw thread 25. A lock nut 28 with an internal thread 29 to engage the screw thread 25 is provided to lock the second pipe with respect to the first nut 26. A second nut 30 has an internal screw thread 31 which engages an outer screw thread 32 on the first nut 26. The second nut also includes an abutment portion 33 which engages with a corresponding abutment 34 on the first pipe 20. A circlip 35 on the inner surface of the second nut 30 prevents the first nut from being unscrewed from the screw thread 31.

The operation of the telescopic pipe arrangement as shown in FIG. 3 is then as follows.

The lock nut 28 is unscrewed from the first nut 26 and the first nut 26 is wound out of the second nut 30 as far as the circlip 35 and the two nipped together. The first and second nuts then act as one item. The first nut 26 can be rotated along with the second nut 30 so that the end surface 36 of the first nut engages with the end surface 37 of the pipe 20 so that with further rotation of the first nut the inner pipe 21 can be moved axially with relation to the pipe 20 outwards. If the second nut is rotated now in the opposite direction then after approximately one half of a revolution, abutment 33 on the second nut 30 engages with abutment 34 on the first pipe 20 and, after further rotation the inner pipe 21, can be moved axially inwardly with relation to pipe 20. When the desired amount of extension or retraction is reached, the first nut 26 is held steady and the second nut is rotated so that any clearance between surfaces 36 and 37 is taken up and the abutment flange 33 engages with the abutment 34 and the surfaces 37 and 36 are firmly engaged and locked together. The lock nut 28 is then firmly engaged onto the nut 26 to set the pipe at that length, and thus prevent rotation movement of the pipe 21 within nut 26. The whole unit then becomes locked together.

The embodiment of the telescoping arrangement as shown in FIG. 4 has a locking screw 40 which passes radially through a circumferential slot or aperture 41 (not fully shown) in the second nut 42 and engages into the first nut 43. A lubricated packing ring 44 is provided between surface 45 of the first nut and the surface 46 of pipe 47 to provide a less frictional bearing surface when first nut 43 and second nut 42 are being rotated on pipe 47. In one engagement position at one end of the slot 41, the screw 40 enables disengagement of the abutment 48 on the pipe 47 and the abutment flange 49 on the union 42 so that pipe length adjustment may be made. When the correct adjustment has been made, the surface 46 is locked against the surface 45, the lock nut 50 is engaged against the first nut 43, and second nut 42 is slightly rotated to lock the abutment 48 against the abutment flange 49. The locking screw 40 is then locked to fix the entire assembly. The clearance may be adjusted so that the movement of the screw 40 in the circumferential slot 41 from one end to the other will provide the two engagement positions.

Now looking at FIG. 5, it will be seen that there is provided a horizontal pipe arrangement 10 (FIG. 2) having an outer pipe 60 with threads 61 at one end to engage into elbow 5 (FIG.2). An internal pipe 62 has O-ring seals 63 engaged onto the inner wall 64 of the first pipe 60, and the second pipe 62 extends to a tapering screw-threaded portion 65, which engages with elbow 11 (FIG. 2). A telescoping arrangement generally shown as 66 provides engagement and adjustment between the first pipe and the second pipe.

The second pipe 62 has a long screw thread 72 on its outer surface and first nut 68 has a screw thread 79 on its inner surface which engages the screw thread 72. A lock washer 67 is located between the first nut 68 and the end 81 of the first pipe to lock the first pipe 60 and the second pipe 62 together so as to prevent rotation of the second pipe. The lock washer 67 has a locking tab 70 on its internal diameter, as can be more easily seen in FIG. 6 which, when installed on the second pipe 62 engages in a machined slot or keyway 71 on pipe 62, runs down the length of the thread 72, and is machined into the outer surface of pipe 62 to substantially the same depth as thread 72.

The second nut 69 has an inner screw thread 74 which engages an outer screw thread 75 on the nut 68. The second nut 69 also includes an abutment portion 76 which engages with an abutment 77 on first pipe 60. A circlip 78 on the inner surface of the second nut 69 also prevents the first nut 68 from being unscrewed from the screw thread 74.

The nut 68 which is shown in more detail in FIG. 7 includes an inner thread 79 and an outer thread 75 and, at one end, includes a plurality of slots 80 which can be engaged with a peg spanner to enable rotation of the nut 68 when it is within the nut 69.

A knurled outer surface 84 is provided on the second nut so that it can be turned by hand.

The operation of the telescopic pipe arrangement as shown in FIG. 5 is then as follows.

The first nut 68 is wound out of the second nut 69 as far as the circlip 78 and nipped up. The two items then act as one item. The first nut 68 can be rotated along with the second nut 69 so that the end surface 83 engages the lock washer 67 which engages the abutment 77 and with further rotation the inner pipe can be moved axially with relation to the outer pipe. If the first and second nuts nipped together are rotated in the opposite direction then abutment 77 again engages abutment 76 and the inner pipe is moved with respect to the outer pipe in the opposite direction.

When the desired amount of extension or retraction is reached the first nut 68 is held steady and the second nut 69 is rotated to remove the engaging connection between the nuts, and further rotation of the second nut approximately half a revolution takes up any clearance between face 81 and the face 83 with the lock washer 67 in between them and the abutment 76 engages with the abutment 77 and are locked together. The lock washer 67 is now prevented from rotating and the locking tab 70 which is located in the machined slot 71 prevents rotational movement of the pipe 62 within the nut 68. The whole unit thus becomes locked together.

The locking sequence of this embodiment then is as follows. In a first position, the first nut is engaged against the second nut so that they act as one unit for adjustment purposes. In a second position, the locking of the abutting faces against the lock washer secures the second nut as a complete unit with the outer pipe and removes unwanted play in the unit. The lock washer located in the machine slot then prevents the inner pipe from rotating when in the locked stage.

The second nut 69 may be provided with slots in the end face 85 which will enable a tool to be engaged onto the second nut so that it can be held while the first nut is being turned.

FIG. 8 shows an alternative embodiment of first nut, which is formed as a spread nut. In this embodiment, the spread nut 90 has an internal thread 91, and an external thread 92 and is formed with a slit 93 and thickness-reduction 94 so that the nut can be spread apart at the slit 93 to enable the nut to be placed over the end of internal pipe 62 and then slid onto threads 72. The nut can then be closed-up so that it can be used as a normal nut, and the slots 95 are provided in an end face to enable rotation of the nut in the manner as discussed above.

A nut such as this may be used where both ends of the inner pipe are larger than the thread diameter along the length of the inner pipe so that the nut has to be spread to be placed onto the pipe and then closed up.

I claim:
1. A telescopic pipe arrangement, comprising:
   a first pipe having two axially opposite ends and a longitudinal bore having an inner peripheral wall;
   a second pipe having two axially opposite ends and a longitudinal bore having an inner peripheral wall;
   said second pipe being coaxially telescopically received in said longitudinal bore of said first pipe, so that a first end portion including a first end of said second pipe protrudes axially beyond a first end of said first pipe, and a second end portion including said second end of said second pipe is disposed within said longitudinal bore of said first pipe distally of said first end of said first pipe;
   sealing means circumferentially sealing between said second end portion of said second pipe and said inner peripheral wall of said longitudinal bore of said first pipe;

means defining a first band of helical threading externally on said second pipe between said sealing means and said first end of said second pipe;

a first internally threaded nut threadedly engaged on said first band of helical threading axially adjacent said first end of said first pipe;

means defining a second band of helical threading externally on said first internally threaded nut;

a second internally threaded nut threadedly engaged on said second band of helical threading;

an external radial flange provided on said first pipe adjacent said first end of said first pipe and having a first abutment shoulder facing axially away from said first end of said first pipe;

said second internally threaded nut including an internal radial flange disposed on an axially opposite side of said external radial flange of said first pipe from said first end of said first pipe, and having a second axially facing abutment shoulder arranged to engage said first abutment shoulder of said external radial flange upon movement of said second nut axially towards said first end of said pipe upon corresponding rotation of said first nut relative to said second pipe;

means for locking said first nut with respect to said second nut upon achieving a first degree of relative threaded rotation of said first nut relative to said second nut such as to advance said first nut axially towards said first end of said second pipe both absolutely and relative to said second nut, so that upon rotation of said first nut in one direction, said first pipe first causes an axial end of the first nut to effectively bear axially against said first end of said first pipe, with said first and second abutment shoulders effectively disengaged, and, upon further rotation in said one direction, causes increased axial extension of said second pipe relative to said first pipe, and rotation of said first nut in an opposite direction on said first pipe first causes said first and second abutment shoulders to effectively engage, with said axial end of said first nut effectively no longer bearing axially against said first end of said first pipe, and, upon further rotation in said opposite direction, causes increased axial retraction of said second pipe relative to said first pipe, and for unlocking said second nut with respect to said first nut upon achieving a second degree of initially forced relative threaded rotation of said second nut relative to said first nut, such as to extend said second nut axially towards said first end of said second pipe both absolutely and relative to said first nut, so that upon restraining said first nut against rotation and further rotation of said second nut, said axial end of said first nut is caused to effectively axially bear against said first end of said first pipe while said first and second abutment shoulders are caused to effectively engage, for preventing rotation of said first nut relative to second pipe, thereby providing an adjustedly fixed degree of extension of said second pipe relative to said first pipe; and means selectively operable for preventing rotation of the second pipe relative to the first pipe for preserving said adjustedly fixed degree of extension of said second pipe relative to said first pipe.

2. The telescopic pipe arrangement of claim 1, wherein:

said means selectively operable for preventing rotation of said second pipe relative to said first pipe comprises an internally threaded locking ring threadedly mounted on said first band of helical threading, on said first end portion of said second pipe, and arranged to be threaded thereon into axial engagement with said first nut.

3. The telescopic pipe arrangement of claim 1, wherein:

said means selectively operable for preventing rotation of said second pipe relative to said first pipe comprises a lock washer arranged to engage between said first nut and said first pipe at said first end of said first pipe, and having locking means with said second pipe for preventing rotation of said second pipe relative to said lock washer.

4. The telescopic pipe arrangement of claim 3, wherein:

said second pipe has means defining a radially outwardly opening axially extending keyway groove provided externally therein; and said lock washer includes an annular portion having an inner peripheral edge, and said locking means comprises a tab extending radially inwardly from said peripheral edge and radially into said keyway groove.

5. The telescopic pipe arrangement of claim 4, wherein:

said tab further includes a bent radially inner end portion which extends axially in said groove, axially beyond said annular portion of said lock washer.

6. The telescopic pipe arrangement of claim 1, wherein:

said first nut is a generally C-shaped, contact-to-close, spread-to-open split nut.

7. The telescopic pipe arrangement of claim 1, wherein:

said first nut includes an external circumferential flange having a band of helical threading provided on a radially outer peripheral edge thereof for threaded engagement with said first band of helical threading on said second pipe, and having said axial end of said first nut on one axial face thereof, and an axial shoulder on an axially opposite face thereof;

said means for locking said first nut with respect to said second nut comprises a circlip received in a radially inwardly opening groove in said second nut on an axially opposite side of said external circumferential flange of said first nut from said first end of said first pipe and arranged to be engaged by said axial shoulder of said external circumferential flange of said first nut.

8. The telescopic pipe arrangement of claim 1, further comprising:

means defining wrench accepting groove means on an axially facing surface on said first nut, for externally accessible axial engagement from a location that is disposed radially inwardly of said second nut.

* * * * *